(12) United States Patent
Tomura et al.

(10) Patent No.: US 10,293,627 B2
(45) Date of Patent: May 21, 2019

(54) PRINTED MATTER, PRINTING METHOD, AND PRINTING DEVICE

(71) Applicants: Tatsuya Tomura, Tokyo (JP); Yoshimasa Miyazawa, Kanagawa (JP); Takuya Fujita, Kanagawa (JP)

(72) Inventors: Tatsuya Tomura, Tokyo (JP); Yoshimasa Miyazawa, Kanagawa (JP); Takuya Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 15/674,654

(22) Filed: Aug. 11, 2017

(65) Prior Publication Data
US 2018/0056692 A1   Mar. 1, 2018

(30) Foreign Application Priority Data

Aug. 24, 2016 (JP) ................................. 2016-163691
Jul. 13, 2017 (JP) ................................. 2017-136786

(51) Int. Cl.
| | | |
|---|---|---|
| *B32B 3/00* | (2006.01) | |
| *B41M 5/00* | (2006.01) | |
| *C09D 11/322* | (2014.01) | |
| *B41M 5/50* | (2006.01) | |
| *B41M 5/52* | (2006.01) | |

(52) U.S. Cl.
CPC .......... *B41M 5/0047* (2013.01); *B41M 5/502* (2013.01); *C09D 11/322* (2013.01); *B41M 5/5218* (2013.01)

(58) Field of Classification Search
CPC ..... B41M 5/0047; B41M 5/502; B41M 5/508
See application file for complete search history.

(56) References Cited

U.S. PATENT DOCUMENTS

| | | | |
|---|---|---|---|
| 2009/0008142 A1* | 1/2009 | Shimizu ................... | B32B 5/18 174/261 |
| 2015/0273885 A1* | 10/2015 | Imai .......................... | B41J 2/01 347/21 |

FOREIGN PATENT DOCUMENTS

| | | |
|---|---|---|
| JP | 11-192775 | 7/1999 |
| JP | 2003-306625 | 10/2003 |
| JP | 2004-207558 | 7/2004 |
| JP | 2006-299329 | 11/2006 |
| JP | 2011-052041 | 3/2011 |
| JP | 2012-035590 | 2/2012 |
| JP | 2013-095081 | 5/2013 |
| JP | 2013-129793 | 7/2013 |

* cited by examiner

*Primary Examiner* — Elizabeth E Mulvaney
(74) *Attorney, Agent, or Firm* — Oblon, McClelland, Maier & Neustadt, L.L.P.

(57) ABSTRACT

A printed matter is provided. The printed matter includes a porous printing medium and a printed layer. The printed layer contains silver and has a printed surface having an image clarity (2 mm), defined in Japanese Industrial Standards H8686-2, of 5.0 or more and a b* value in the range of from −7.0 to +4.0.

14 Claims, 2 Drawing Sheets

PRINTED MATTER, PRINTING METHOD, AND PRINTING DEVICE

CROSS-REFERENCE TO RELATED APPLICATIONS

This patent application is based on and claims priority pursuant to 35 U.S.C. § 119(a) to Japanese Patent Application Nos. 2016-163691 and 2017-136786, filed on Aug. 24, 2016 and Jul. 13, 2017, respectively, in the Japan Patent Office, the entire disclosure of each of which is hereby incorporated by reference herein.

BACKGROUND

Technical Field

The present disclosure relates to a printed matter, a printing method, and a printing device.

Description of the Related Art

Objects having metallic luster give us a gorgeous impression. We often see such objects in various scenes in everyday life. A metal itself can be a designed object having metallic luster. However, most designed objects having metallic luster are obtained by coating a substrate with a colored composition having metallic luster.

The coating involves printing with an ink containing a glittering pigment or transferring a foil with an adhesive or by thermal fusion bonding.

Among various metallic luster colors, gold color has been a symbol of wealth from ancient times and preferably used in celebratory events, for example, at New Year's events. In addition, silver color has also been popular for its subdued impression and seen in various scenes. Unlike gold color, silver color can express various metallic luster colors, including gold color, when being mixed with a colored composition having a different color. Thus, silver color has broader utility and higher industrial availability than gold color.

As a pigment used for colored compositions having silver metallic luster color, fine aluminum particles have been widely used. However, it is generally difficult to stably disperse fine aluminum particles in a colored composition for their large specific gravity. In particular, fine aluminum particles in a colored composition will precipitate with time and, in some cases, will adhere to each other to form a hard cake thereof.

On the other hand, for reducing environmental load, colored compositions, such as printing inks, have been successively replaced with those based on water and containing least organic solvents. However, in such water-based colored compositions, fine aluminum particles will react with water to generate hydrogen gas and will convert into alumina particles while eliminating the metallic luster of aluminum.

In addition, not only fine aluminum particles but also typical glittering pigments have a drawback that they easily come off when strongly rubbed, due to their poor abrasion resistance.

In accordance with recent development of inkjet printing technology, demand for inkjet-printed matters having metallic luster is also increasing.

At the same time, printing media have become more diverse recently. There are variety of printed matters in many fields, such as those printed in offices and those large in size printed in the field of commercial printing. Each printed matter is capable of expressing full-color images by mixing multiple colors, but not yet capable of providing a high image clarity of specular surface.

If silver metallic luster color having particularly high image clarity of specular surface were available, it would be possible to obtain full-color printed matters having high image clarity by mixing various colors, which has high potential in industrial use.

SUMMARY

In accordance with some embodiments of the present invention, a printed matter is provided. The printed matter includes a porous printing medium and a printed layer. The printed layer contains silver and has a printed surface having an image clarity (2 mm), defined in Japanese Industrial Standards H8686-2, of 5.0 or more and a $b^*$ value in the range of from $-7.0$ to $+4.0$.

In accordance with some embodiments of the present invention, a printing method is provided. The printing method includes: applying thermal or mechanical energy to an ink containing silver particles; and jetting the ink onto a porous printing medium to obtain a printed matter.

In accordance with some embodiments of the present invention, a printing device is provided. The printing device includes an ink, a porous printing medium, and a discharger. The ink contains 1.0% to 15.0% by mass of silver particles having an average particle diameter in the range of from 15 to 100 nm. The porous printing medium has pores having an average pore diameter in the range of from 100 to 400 nm. The discharger is configured to discharge the ink onto the porous printing medium.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
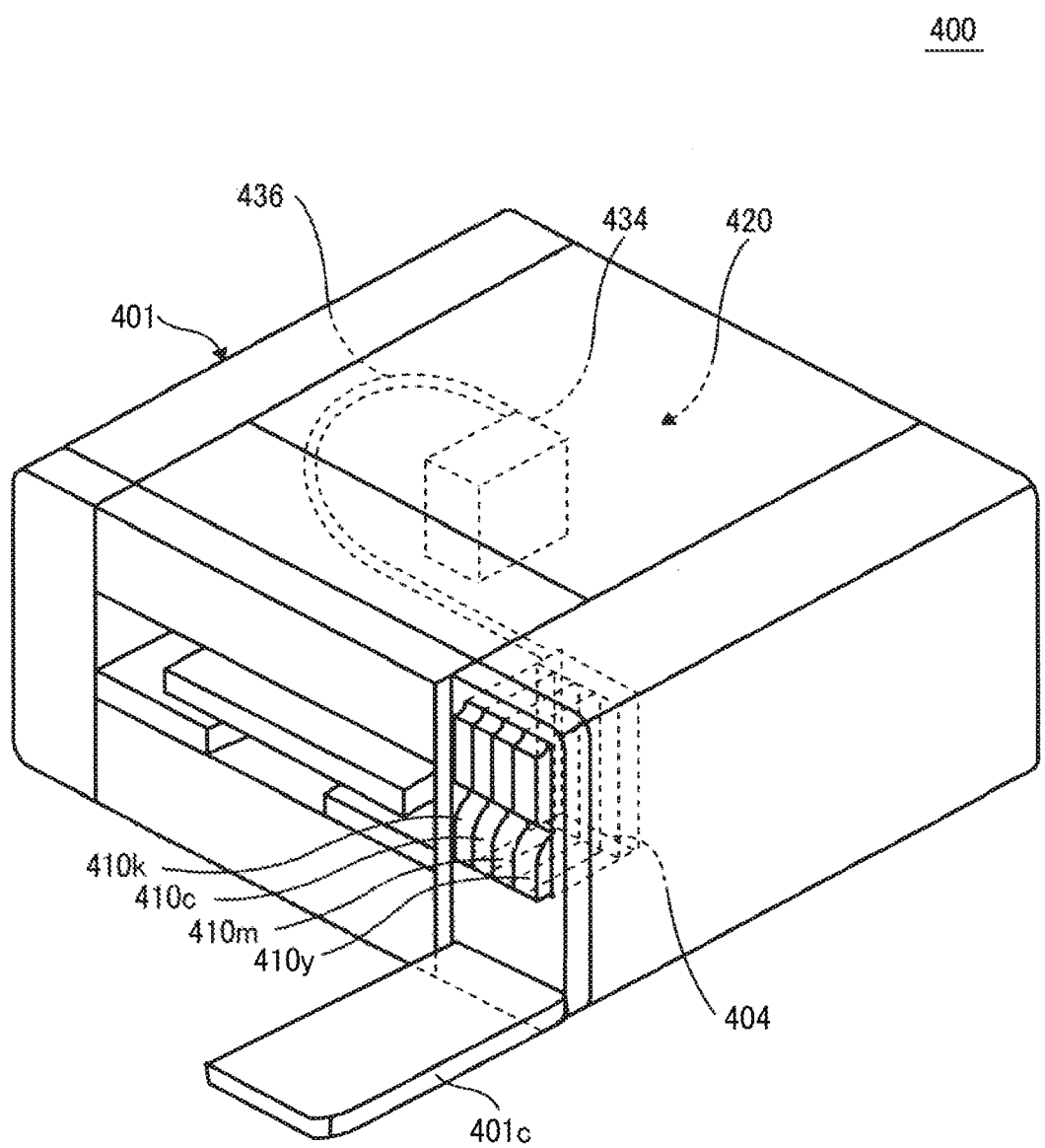
FIG. 1 is a schematic view of a recording device using an ink according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a printed matter is provided that has excellent image clarity and metallic luster.

If an inkjet ink containing a commercially-available scale-like aluminum pigment or titanium-oxide-coated mica pigment as a glittering pigment is discharged, defective discharge of the ink will immediately occur because the particle diameter of the glittering pigment is too large to be reliably discharged from an inkjet head.

Even if the scale-lake aluminum pigment was subjected to a pretreatment so as not to precipitate in the ink, nozzle clogging will occur when the ink is left to stand without being used.

Water-resistant aluminum pigments have poor safety because hydrogen gas will be generated when contained in a water-based ink.

In accordance with some embodiments of the present invention, a printed matter is provided that has metallic luster and excellent image fastness and abrasion resistance, by use of an ink containing silver particles that exhibits safety and excellent dispersion stability without causing defective discharge even after being left to stand.

Printed Matter

A printed matter according to an embodiment of the present invention includes a porous printing medium and a printed layer. The printed layer contains silver. The printed layer has a printed surface having an image clarity (2 mm) defined in JIS H8686-2 of 5.0 or more and a b* value in the range of from −7.0 to +4.0.

Whether the printed layer contains silver or not can be determined by a SEM-EDS instrument, i.e., an instrument having functions of both scanning electron microscope (SEM) and energy dispersive spectrometer (EDS). Alternatively, silver contained in the printed matter can be detected by a fluorescent X-ray instrument.

The printed matter can be obtained by an inkjet printing method in which an ink containing silver particles is applied with thermal or mechanical energy to be jetted onto a porous printing medium.

Ink Containing Silver Particles

In accordance with some embodiments of the present invention, silver is used as a glittering pigment. Silver is a metal having a higher degree of whiteness among metals. Advantageously, silver can express various metallic colors when combined with inks having different colors. Silver is stable in water due to its weak reactivity with water. Therefore, silver can be applied to water-based glittering inks, which contributes to reduction of environmental load. Compositional materials of the ink containing silver (hereinafter "silver ink"), such as silver particles, organic solvents, water, resins, and other additives, are described in detail below. The silver ink may contain a silver colloid containing silver particles, and water or a solvent having a moisture retention function. In addition, the silver ink may optionally include a surfactant, a defoamer, a preservative, a fungicide, a corrosion inhibitor, and/or a pH adjuster. Furthermore, the silver ink may contain a resin.

Silver Particles

Preferably, the silver particles have an average particle diameter in the range of from 15 to 100 nm, more preferably from 30 to 60 nm. When the average particle diameter is 15 nm or more, the silver particles are prevented from entering into an ink absorbing layer and being present at the lowermost surface of the printed matter. Thus, metallic luster can be well exhibited without adversely affected by the yellow color of nano silver particles. When the average particle diameter is 100 nm or less, the ink can be reliably discharged without causing precipitation of the silver particles with time. In the present disclosure, an "average particle diameter" refers to a number average particle diameter of primary particles, unless otherwise specified.

The average particle diameter can be measured by a laser diffraction particle size distribution analyzer. Specific examples of the laser diffraction particle size distribution analyzer include, but are not limited to, those employing a dynamic light scattering method, such as MICROTRACK UPA available from Nikkiso Co., Ltd.

The content rate of the silver particles in the silver ink is preferably in the range of from 1.0% to 15.0% by mass, more preferably from 2.5% to 12% by mass, much more preferably from 3% to 12% by mass, and most preferably from 3% to 10% by mass, for improving image clarity, metallic luster, dispersion stability of the silver particles, and storage stability and discharge stability of the silver ink.

Silver Colloid Liquid

Preferably, the silver particles are dispersed in an aqueous dispersion medium forming silver colloids to the surface of which protection colloids are adhered. In this case, the silver particles can be well dispersed in the aqueous dispersion medium and storage stability of the silver ink is improved. The silver colloids may be prepared by, for example, reducing silver ion contained in a solution with a reducing agent in the presence of protection colloids, as described in JP-2006-299329. In a case in which metallic colloids are prepared by such a method, dispersion stability of the metallic particles is more improved as a surfactant is added to the solution at any time before and after the reduction reaction.

The protection colloids comprise an organic matter capable of protecting the surfaces of silver particles. Specific examples of such organic matters include, but are not limited to, carboxyl-group-containing organic compounds and polymeric dispersants. Each of these materials can be used alone or combination with others. Combinations are more preferable for their synergistic effects.

Carboxyl-Group-Containing Organic Compounds

The number of carboxyl groups in one molecule of the carboxyl-group-containing organic compound is at least one, and may be in the range of from 1 to 10, preferably from 1 to 5, and more preferably from 1 to 3.

A pan or all of the carboxyl groups in the carboxyl-group-containing organic compound may form a salt (e.g., amine salt, metal salt). In particular, organic compounds in which most carboxyl groups are not forming salts, i.e., organic compounds containing free carboxyl groups, are preferable. More particularly, organic compounds in which all the carboxyl groups are not forming salts (e.g., amine salts) with a basic compound (e.g., amine) are preferable.

The carboxyl-group-containing organic compound may further contain functional groups (including ligand groups for metallic compounds or metallic nano particles) other than carboxyl group.

Examples of such functional groups (including ligand groups) other than carboxyl group include, but are not limited to, groups containing at least one hetero atom selected from halogen atoms (e.g., fluorine atom, chlorine atom, bromine atom, iodine atom), nitrogen atom, oxygen atom, and sulfur atom. Specific examples of such groups include, but are not limited to: nitrogen-atom-containing groups, such as amino group, substituted amino groups (e.g., dialkylamino group), imino group (—NH—), nitrogen ring groups (e.g., 5-membered to 8-membered nitrogen ring group such as pyridyl group; carbazole group; morpholinyl group), amide group (—CON<), cyano group, and nitro group; oxygen-atom-containing groups, such as hydroxyl group, alkoxy groups (e.g., C1-C6 alkoxy groups such as methoxy group, ethoxy group, propoxy group, and butoxy group), formyl group, carbonyl group (—CO—), ester group (—COO—), and oxygen ring groups (e.g., 5-membered to 8-membered oxygen ring groups such as tetrahydropyranyl group); sulfur-atom-containing groups, such as thio group, thiol group, thiocarbonyl group (—SO—), alkylthio groups (e.g., C1-C4 alkylthio groups such as methylthio group and ethylthio group), sulfo group, sulfamoyl group, and sulfinyl group (—SO$_2$—); and these groups forming a salt (e.g., ammonium salt group). Each of these functional groups may be contained in the carboxyl-group-containing organic compound alone or in combination with others.

Among the above functional groups, basic groups capable of forming a salt with carboxyl group, such as amino group, substituted amino group, imino group, and ammonium salt group, are preferably not contained in the carboxyl-group-containing organic compound.

Examples of the carboxyl-group-containing organic compound include carboxylic acids. Examples of carboxylic acids include, but are not limited to, monocarboxylic acids, polycarboxylic acids, and hydroxycarboxylic acids (or oxycarboxylic acids).

Specific examples of the monocarboxylic acids include, but are not limited to, aliphatic monocarboxylic acids and aromatic monocarboxylic acids. Specific examples of the aliphatic monocarboxylic acids include, but are not limited to, saturated aliphatic monocarboxylic acids (e.g., C1-C34 aliphatic monocarboxylic acids such as acetic acid, propionic acid, butyric acid, caprylic acid, caproic acid, hexanoic acid, capric acid, lauric acid, myristic acid, cyclohexane carboxylic acid, dehydrocholic acid, and cholanic acid, preferably C1-C30 aliphatic monocarboxylic acids) and unsaturated aliphatic monocarboxylic acids (e.g., C4-C34 unsaturated aliphatic monocarboxylic acids such as oleic acid, erucic acid, linoleic acid, and abietic acid, preferably C10-C30 unsaturated aliphatic monocarboxylic acids). Specific examples of the aromatic monocarboxylic acids include, but are not limited to, C7-C12 aromatic monocarboxylic acids such as benzoic acid and naphthoic acid.

Specific examples of the polycarboxylic acids include, but are not limited to, aliphatic polycarboxylic acids and aromatic polycarboxylic acids. Specific examples of the aliphatic polycarboxylic acids include, but are not limited to, aliphatic saturated polycarboxylic acids (e.g., C2-C14 aliphatic saturated polycarboxylic acids such as oxalic acid, malonic acid, succinic acid, glutaric acid, adipic acid, azelaic acid, sebacic acid, and cyclohexanedicarboxylic acid, preferably C2-C10 aliphatic saturated polycarboxylic acids) and aliphatic unsaturated polycarboxylic acids (e.g., C4-C14 aliphatic unsaturated polycarboxylic acids such as maleic acid, fumaric acid, itaconic acid, sorbic acid, and tetrahydrophthalic acid, preferably C4-C10 aliphatic unsaturated polycarboxylic acids). Specific examples of the aromatic polycarboxylic acids include, but are not limited to, C8-C12 aromatic polycarboxylic acids such as phthalic acid and trimellitic acid.

Specific examples of the hydroxycarboxylic acids include, but are not limited to, hydroxymonocarboxylic acids and hydroxypolycarboxylic acids. Specific examples of the hydroxymonocarboxylic acids include, but are not limited to, aliphatic hydroxymonocarboxylic acids (e.g., C2-C50 aliphatic hydroxymonocarboxylic acids such as glycolic acid, lactic acid, hydrobutyric acid, glyceric acid, 6-hydroxyhexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid, preferably C2-C34 aliphatic hydroxymonocarboxylic acids, more preferably C2-C30 aliphatic hydroxymonocarboxylic acids) and aromatic hydroxymonocarboxylic acids (e.g., C7-C12 aromatic hydroxymonocarboxylic acids such as salicylic acid, oxybenzoic acid, and gallic acid). Specific examples of the hydroxypolycarboxylic acids include, but are not limited to, aliphatic hydroxypolycarboxylic acids (e.g., C2-C10 aliphatic hydroxypolycarboxylic acids such as tartronic acid, tartaric acid, citric acid, and malic acid).

Each of the above carboxylic acids may form a salt, anhydride, or hydrate. In many cases, carboxylic acids are not forming a salt (in particular a salt with a basic compound, such as an amine salt). Each of the above carboxyl-group-containing organic compounds may be used alone or in combination with others.

Among the above carboxyl-group-containing organic compounds, hydroxycarboxylic acids such as aliphatic hydroxycarboxylic acids (e.g., aliphatic hydroxymonocarboxylic acids, aliphatic hydroxypolycarboxylic acids) are preferable. Among aliphatic hydroxycarboxylic acids, alicyclic hydroxycarboxylic acids (i.e., hydroxycarboxylic acids having an alicyclic backbone) are more preferable, such as C6-C34 alicyclic hydroxycarboxylic (e.g., cholic acid), preferably C10-C34 alicyclic hydroxycarboxylic acids, more preferably C16-C30 alicyclic hydroxycarboxylic acids.

In particular, polycyclic aliphatic carboxylic acids (e.g., C10-C50 condensed polycyclic aliphatic carboxylic acids, preferably C12-C40 condensed polycyclic aliphatic carboxylic acids, more preferably C14-C34 condensed polycyclic aliphatic carboxylic acids, particularly C18-C30 condensed polycyclic aliphatic carboxylic acids) are preferable, because they have a bulky structure that effectively suppresses aggregation of silver particles. Examples of such polycyclic aliphatic carboxylic acids include: polycyclic aliphatic hydroxycarboxylic acids (e.g., condensed polycyclic aliphatic hydroxycarboxylic acids, preferably C10-C34 condensed polycyclic aliphatic hydroxycarboxylic acids, more preferably C14-C34 condensed polycyclic aliphatic hydroxycarboxylic acids, particularly C18-C30 condensed polycyclic aliphatic hydroxycarboxylic acids) such as cholic acid; and polycyclic aliphatic carboxylic acids (e.g., condensed polycyclic aliphatic carboxylic acids, preferably C10-C34 condensed polycyclic aliphatic carboxylic acids, more preferably C14-C34 condensed polycyclic aliphatic carboxylic acids, particularly C18-C30 condensed polycyclic aliphatic carboxylic acids) such as dehydrocholic acid and cholanic acid.

Preferably, the carboxyl-group-containing organic compound has a molecular weight of 1,000 or less (e.g., about 46 to 900), more preferably 800 or less (e.g., about 50 to 700), and most preferably 600 or less (e.g., about 100 to 500).

Preferably, the carboxyl-group-containing organic compound has a pKa value of 1 or more (e.g., about 1 to 10), preferably 2 or more (e.g., about 2 to 8).

Polymeric Dispersant

In accordance with some embodiments of the present invention, the protection colloids may comprise a combination of the carboxyl-group-containing organic compound and a polymeric dispersant. In a case in which the protection colloids comprise such a combination, the silver colloids include a remarkably small number of coarse silver particles. In particular, by use of a specific combination of the carboxyl-group-containing organic compound and a polymeric dispersant as the protection colloids, the proportion of silver particles in the silver colloids can be increased even though the amount of coarse silver particles is small, thereby improving storage stability of the silver colloids (and a liquid dispersion thereof).

The polymeric dispersant comprises a material capable of coating silver particles. Specific preferred examples of such a material include, but are not limited to, amphiphilic polymeric dispersants (including oligomer dispersants).

Specifically, polymeric dispersants generally used for dispersing colorants in the field of paints and inks can be used. Specific examples of such polymeric dispersants include, but are not limited to, styrene resins (e.g., styrene-acrylic acid copolymer, styrene-methacrylic acid copolymer, styrene-maleic anhydride copolymer), acrylic resins (e.g., methyl acrylate-acrylic acid copolymer, methyl acrylate-methacrylic acid copolymer, methyl methacrylate-acrylic acid copolymer, methyl methacrylate-methacrylic acid copolymer), water-soluble urethane resins, water-soluble acrylic urethane resins, water-soluble epoxy resins, water-soluble polyester resins, cellulose derivatives (e.g., nitrocellulose; and cellulose ethers such as alkyl celluloses such as ethyl cellulose, alkyl hydroxyalkyl celluloses such as ethyl hydroxyethyl cellulose, hydroxyalkyl celluloses such as hydroxyethyl cellulose and hydroxypropyl cellulose, carboxyalkyl celluloses such as carboxymethyl cellulose), polyvinyl alcohols, polyalkylene glycols (e.g., liquid polyethylene glycol, polypropylene glycol), natural polymers (e.g., gelatin, dextrin), polyethylene sulfonates, and formalin condensates of naphthalenesulfonic acid.

Examples of the amphiphilic polymeric dispersants include resins (including water-soluble resins and water-dispersible resins) containing a hydrophilic unit (or hydrophilic block) comprising a hydrophilic monomer.

Specific examples of the hydrophilic monomer include, but are not limited to: addition polymerizable monomers such as carboxyl-group-containing or acid-anhydride-containing monomers (e.g., acrylic or methacrylic monomers such as acrylic acid and methacrylic acid, unsaturated polycarboxylic acids such as maleic acid, maleic anhydride) and hydroxyl-group-containing monomers (e.g., hydroxyalkyl acrylates and methacrylates such as 2-hydroxyethyl acrylate and 2-hydroxyethyl methacrylate); and condensation polymerizable monomers such as alkylene oxides (e.g., ethylene oxide).

The condensation polymerizable monomer may form a hydrophilic unit through a reaction with an active group such as hydroxyl group (e.g., the hydroxyl-group-containing monomer). Each of the above hydrophilic monomers may form a hydrophilic unit alone or in combination with others.

The polymeric dispersant includes at least a hydrophilic unit (or hydrophilic block). The polymeric dispersant may comprise either a homopolymer or copolymer of the above hydrophilic monomers (e.g., polyacrylic acid and a salt thereof). Alternatively, the polymeric dispersant may comprise a copolymer of a hydrophilic monomer and a hydrophobic monomer, such as the above-exemplified styrene resins and acrylic resins. Specific examples of the hydrophobic monomer (i.e., non-ionic monomer) include, but are not limited to, acrylic and methacrylic monomers such as acrylates and methacrylates (e.g., C1-C20 alkyl acrylates and methacrylates such as methyl acrylate and methacrylate, ethyl acrylate and methacrylate, n-butyl acrylate and methacrylate, 2-ethylhexyl acrylate and methacrylate, lauryl acrylate and methacrylate, and stearyl acrylate and methacrylate; cycloalkyl acrylates and methacrylates such as cyclohexyl acrylate and methacrylate; aryl acrylates and methacrylates such as phenyl acrylate and methacrylate; and aralkyl acrylates and methacrylates such as benzyl acrylate and methacrylate and 2-phenylethyl acrylate and methacrylate), styrene monomers (e.g., styrene, α-methylstyrene, vinyl toluene), olefin monomers (e.g., C2-C20 α-olefins such as ethylene, propylene, 1-butene, isobutylene, 1-hexene, 1-octene, 1-dodecene), and carboxylic acid vinyl ester monomers (e.g., vinyl acetate and vinyl butyrate). Each of these hydrophobic monomers may form a hydrophobic unit alone or in combination with others.

In a case in which the polymeric dispersant comprises a copolymer (e.g., a copolymer of a hydrophilic monomer and a hydrophobic monomer), the copolymer may be any of a random copolymer, an alternating copolymer, a block copolymer (e.g., a copolymer comprising a hydrophilic unit comprising a hydrophilic monomer and a hydrophobic unit comprising a hydrophobic monomer), and a comb-like copolymer (e.g., comb-like graft copolymer).

The block copolymer may take a diblock structure or a triblock structure (e.g., ABA type, BAB type). With respect to the comb-like copolymer, the main chain thereof may comprise any of the hydrophilic unit, the hydrophobic unit, and both of the hydrophilic block and the hydrophobic block.

The hydrophilic unit may comprise a condensed block, such as a hydrophilic block comprising an alkylene oxide (e.g., ethylene oxide), such as a polyalkylene oxide (e.g., polyethylene oxide, polyethylene oxide-polypropylene oxide).

The hydrophilic block (e.g., polyalkylene oxide) and the hydrophobic block (e.g., polyolefin block) may be bound to each other via a linking group such as ester bond, amide bond, ether bond, and urethane bond. Such a bond may be formed by modifying the hydrophobic block (e.g., polyolefin) with a modifying agent (e.g., unsaturated carboxylic acids and anhydrides thereof such as maleic acid and maleic anhydride; lactam; aminocarboxylic acid; hydroxylamine; diamine) and introducing the hydrophilic block thereto. A comb-like copolymer (the main chain of which comprising the hydrophobic block) may be formed by reacting (or binding) a polymer obtained from a monomer containing a hydrophilic group such as hydroxyl group and carboxyl group (e.g., hydroxyalkyl acrylates and methacrylates) with the above-described condensation polymerizable hydrophilic monomer (e.g., ethylene oxide).

In addition, a hydrophilic non-ionic monomer can be copolymerized together for balancing hydrophilicity and hydrophobicity.

Specific examples of such copolymerizable components include, but are not limited to, monomers and oligomers comprising an alkyleneoxy unit (preferably ethyleneoxy unit), such as 2-(2-methoxyethoxy)ethyl acrylate, 2-(2-methoxyethoxy)ethyl methacrylate, and polyethylene glycol monomethacrylate (having a number average molecular weight of about 200 to 1,000).

Alternatively, the balance between hydrophilicity and hydrophobicity may be adjusted by modifying (e.g., esterifying) the hydrophilic group (e.g., carboxyl group).

The polymeric dispersant may contain a functional group. Specific examples of the functional group include, but are not limited to, acid groups (e.g., acidic groups such as carboxyl group and acid anhydride group thereof and sulfo groups such as sulfonic acid group) and hydroxyl group. Each of these functional groups may be contained in the polymeric dispersant alone or in combination with others.

In particular, the polymeric dispersant preferably contains an acid group, more preferably carboxyl group.

In a case in which the polymeric dispersant contains acid groups (e.g., carboxyl groups), a part or all of the acid groups (e.g., carboxyl groups) may form a salt (e.g., amine salt, metal salt). In particular, polymeric dispersants in which most acid groups (e.g., carboxyl groups) are not forming salts, i.e., polymeric dispersants containing free acid groups (e.g. carboxyl groups), are preferable. More particularly, polymeric dispersants in which all the acid groups (e.g., carboxyl groups) are not forming salts (e.g., amine salts) with a basic compound (e.g., amine) are preferable.

The polymeric dispersant having an acid group (preferably carboxyl group) may have an acid value of 1 mgKOH/g or more (e.g., about 2 to 100 mgKOH/g), preferably 3 mgKOH/g or more (e.g., about 4 to 90 mgKOH/g), more preferably 5 mgKOH/g or more (e.g., about 6 to 80 mgKOH/g), particularly 7 mgKOH/g or more (e.g., about 8 to 70 mgKOH/g), and typically from 3 to 50 mgKOH/g (e.g., about 5 to 30 mgKOH/g). The polymeric dispersant having an acid group may have an amine value of zero or substantially zero.

The positions of the functional groups in the polymeric dispersant are not limited. The functional groups may be present either in the main chain, a side chain, or both the main chain and a side chain of the polymeric dispersant.

The functional group may be of a functional group derived from a hydrophilic monomer or hydrophilic unit, such as hydroxyl group. The functional group may be introduced to the polymer by copolymerizing a copolymerizable monomer having the functional group, such as maleic anhydride.

Each of the above polymeric dispersants may be used alone or in combination with others.

Specific examples of the polymeric dispersant further include a polymeric pigment dispersant described in JP-2004-207558.

The polymeric dispersant is either commercially or synthetically available.

Specific examples of commercially-available polymeric dispersants (including amphiphilic dispersants) include, but are not limited to: SOLSPERSE series, such as SOLSPERSE 13240, SOLSPERSE 13940, SOLSPERSE 32550, SOLSPERSE 31845, SOLSPERSE 24000, SOLSPERSE 26000, SOLSPERSE 27000, SOLSPERSE 28000, and SOLSPERSE 41090, products of AVECIA GROUP; DISPERBYK series, such as DISPERBYK 160, DISPERBYK 161, DISPERBYK 162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050, products of BYK Japan KK; EFKA-46, EFKA-47, EFKA-48, EFKA-49, EFKA-501, EFKA-1502, EFKA-4540, EFKA-4550, POLYMER 100, POLYMER 120, POLYMER 150, POLYMER 400, POLYMER 401, POLYMER 402, POLYMER 403, POLYMER 450, POLYMER 451, POLYMER 452, and POLYMER 453, products of BASF (formerly EFKA Chemicals); AJISPER series, such as AJISPER PB711, AJISPER PA111, AJISPER PB811, AJISPER PB821, and AJISPER PW911, products of Ajinomoto Co., Inc.; FLOWLEN series, such as FLOWLEN DOPA-158, FLOWLEN DOPA-22, FLOWLEN DOPA-17, FLOWLEN TG-700, FLOWLEN TG-720W, FLOWLEN-730W, FLOWLEN-740W, and FLOWLEN-745W, products of Kyoeisha Chemical Co., Ltd.; and Joncryl® series, such as Joncryl® 678, Joncryl® 679, and Joncryl® 62, products of BASF (formerly Johnson Polymer).

Among these polymeric dispersants, DISPERBYK 190 and DISPERBYK 194 each have an acid group.

The number average molecular weight of the polymeric dispersant may be in the range of from 1,500 to 100,000, preferably from 2,000 to 80,000 (e.g., about 2,000 to 60,000), more preferably from 3,000 to 50,000 (e.g., about 5,000 to 30,000), and particularly from 7,000 to 20,000.

Silver colloid liquids are commercially available from a lot of manufacturers and are applicable to inks by the ink preparation method described above.

Organic Solvent

There is no specific limitation on the type of the organic solvent. For example, water-soluble organic solvents are usable. Usable water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable, since they can function as a wetting agent while providing good drying property.

In addition, polyol compounds having 8 or more carbon atoms and glycol ether compounds are also preferable.

Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, polyol compounds having 8 or more carbon atoms and glycol ether compounds, exemplified above, are capable of improving paper-permeability of the ink, which is advantageous when the ink is printed on a recording medium made of paper.

Preferably, the content rate of the organic solvent in the ink is in the range of from 10% to 60% by mass, more preferably from 20% to 60% by mass, for drying property and discharge reliability of the ink.

Water

Water is a main medium for water-based inks. For reducing ionic impurities as much as possible, pure water such as ion-exchange water, ultrafiltration water, reverse osmosis water, and distilled water, and ultrapure water are preferably used as the medium of water-based inks. In addition, sterile water, sterilized by ultraviolet irradiation or addition of hydrogen peroxide, is preferably used for preventing generation of mold and bacteria during a long-term storage of the silver ink. Preferably, the content rate of water in the silver ink is in the range of from 10% to 75% by mass, more preferably from 20% to 60% by mass, for reducing environmental load and further including other components in the ink.

Preferably, the silver ink further contains a resin for improving abrasion resistance and adhesiveness to printing media. Preferred examples of the resin include water-soluble resins and water-dispersible resins. Each of these resins can be used alone or in combination with others.

Water-Soluble Resin

Specific examples of the water-soluble resins include, but are not limited to, proteins (e.g., gelatin, casein), natural rubbers (e.g., gum arabic), glucosides (e.g., saponin), cellulose derivatives (e.g., methyl cellulose, carboxymethyl cellulose, hydroxymethyl cellulose), lignosulfonate, natural polymers (e.g., shellac), polyacrylate, polyacrylamide, salts of styrene-acrylic acid copolymers, salts of vinylnaphthalene-acrylic acid copolymers, salts of styrene-maleic acid copolymers, salts of vinylnaphthalene-maleic acid copolymers, sodium salts of β-naphthalenesulfonic acid formalin condensates, ionic polymers (e.g., polyphosphoric acid), polyvinyl alcohol, polyvinyl butyral, polyethylene glycol, polypropylene glycol, polyethylene oxide, polyvinyl methyl ether, and polyethyleneimine.

Specific examples of the water-dispersible resin include, but are not limited to, the resins exemplified below.

Resin

Specific examples the resins include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

These resins may be in the form of particles (hereinafter "resin particles"). The resin particles may be dispersed in water to become a resin emulsion. The ink can be obtained by mixing the resin emulsion with other materials such as a colorant and an organic solvent. The resin particles are available either synthetically or commercially. The resin particles may include one type or two or more types of resin particles.

The content rate of the resin in the silver ink ranges from 0.05% to 10.0% by mass, preferably from 0.3% to 4.0% by mass. Within that range, the resin can sufficiently exhibit its function to provide excellent abrasion resistance and metallic luster.

Additives

The ink may further include a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit to a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan K.K., Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

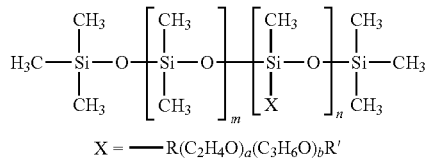

Formula (S-1)

In the formula (S-1), each of m, n, a, and b independently represents an integer, R represents an alkylene group, and R' represents an alkyl group.

Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain.

Among these fluorine-based surfactants, polyoxyalkylene ether polymer compounds having a perfluoroalkyl ether group on its side chain are preferable since foaming property thereof is small. More specifically, compounds represented by the following formula (F-1) and (F-2) are preferable.

$$CF_3CF_2(CF_2CF_2)_m\text{—}CH_2CH_2O(CH_2CH_2O)_nH \quad \text{Formula (F-1)}$$

In the formula (F-1), m is preferably an integer ranging from 0 to 10, and n is preferably an integer ranging from 0 to 40, to give water-solubility to the compound.

$$C_nF_{2n+1}\text{—}CH_2CH(OH)CH_2\text{—}O\text{—}(CH_2CH_2O)_a\text{—}Y \quad \text{Formula (F-2)}$$

In the formula (F-2), Y represents H, $C_mF_{2m+1}$ (where m represents an integer of from 1 to 6), $CH_2CH(OH)CH_2$—$C_mF_{2m+1}$ (where m represents an integer of from 4 to 6), or $C_pF_{2p+1}$ (where p represents an integer of from 1 to 19); n represents an integer of from 1 to 6; and a represents an integer of from 4 to 14.

The fluorine-based surfactants are available either synthetically or commercially.

Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-10, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. Each of these compounds can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

The properties of the ink, such as viscosity, surface tension, and pH, are not particularly limited and can be suitably selected to suit to a particular application.

Preferably, the ink has a viscosity at 25° C. in the range of from 5 to 30 mPa·s, more preferably from 5 to 25 mPa·s, for improving print density and text quality and obtaining good dischargeability. The viscosity can be measured at 25° C. by a rotatory viscometer (RE-80L available from Toki Sangyo Co., Ltd.) equipped with a standard cone rotor (1°34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, for preventing corrosion of metal materials contacting the ink.

Film Thickness of Printed Layer Containing Silver Particles on Porous Printing Medium In the present disclosure, the film thickness of a printed layer of the ink containing silver particles refers to an average film thickness measured after the printed layer has been dried. Preferably, the film thickness is in the range of from 50 to 300 nm, more preferably from 51 to 295 nm, for obtaining a silver-color printed surface having high image clarity. In the present disclosure, a "printed surface" refers to a surface of a printed layer. When the film thickness is 50 nm or more, a printed surface having metal-like image clarity can be easily obtained. More specifically, a printed surface having high image clarity can be obtained without the brown color of the fine silver particles, generated by plasmon absorption, becoming stronger. In other words, a printed surface having high image clarity and silver color tone can be obtained without reddish color tone becoming stronger. When the film thickness is 300 nm or less, the vehicle of the ink containing silver particles can be immediately absorbed in or adsorbed to the porous layer without the brown color of the fine silver particles appearing on the printed surface and reddish color tone becoming stronger. Thus, a printed surface having high image clarity and silver color tone can be obtained. The film thickness needs to be equal to or greater than the particle diameter of one silver particle, since metal-like image clarity is intrinsically exhibited as an interaction between adjacent silver particles arranged in the horizontal direction is increased. When the film thickness is equal to or less than the total particle diameter of eight silver particles stacked in the vertical direction, the vehicle of the ink containing silver particles can be immediately absorbed in or adsorbed to the porous layer without the brown color of the fine silver particles appearing on the printed surface and reddish color tone becoming stronger. Thus, a printed surface having high image clarity and silver color tone can be obtained.

Measurement of Film Thickness of Printed Layer

The film thickness of a printed layer of the ink containing silver particles can be measured by cutting the printed matter and observing a cross-section of the printed layer with a microscope, such as optical microscope, laser microscope, scanning electron microscope (SEM), or transmission electron microscope (TEM).

Image Clarity (2 mm) According to JIS H8686-2

In the present disclosure, an "image clarity value" refers to an image clarity value C measured by a method according to JIS (Japanese Industrial Standards) H8686-2. In the method, an image clarity measuring instrument composed of an optical device and a measuring device is used to measure the image clarity value C. The optical device detects, through a moving optical comb, reflected light (at a light receiving angle of 45 degrees) from a measurement target surface to which light has been directed through a slit at an incident angle of 45 degrees. The measuring device memorizes the detected light quantity as waveform. The image clarity value C can be determined from the following formula based on the varying waveform of the light quantity detected through the optical comb.

$$C(n)=(M-m)/(M+m)\times 100$$

In the formula, C (n) represents an image clarity value (%), M represents a maximum wave height, and m represent a minimum wave height, when the optical comb width is n (nm).

In the present disclosure, an image clarity meter ICM-1 (available from Suga Test Instruments Co., Ltd.) is used as the image clarity measuring instrument, and the optical comb width is set to 2.0 mm.

To obtain a high-image-clarity printed surface that is able to reflect a facing object, the image clarity (2 mm) value needs to be 5.0 or greater, preferably 6 or greater, and more preferably 30 or greater. The upper limit of the image clarity value is 98, since the image clarity value of a specular surface capable of reflecting a real image is at most 98.

b* Value

For securing a silver-color printed surface having high image clarity, the b* value is in the range of from −7.0 to +4.0. More preferably, the b* value is in the range of from −1.8 to +3.9. As the b* value becomes more minus, bluish color becomes stronger. As the b* value becomes more plus, yellowish color becomes stronger. As yellowish color becomes stronger, the color of the ink containing silver particles approaches gold color. When the b* value exceeds +4.0, gold color strongly appears and the color tone becomes far from silver color. When the b* value falls below −7.0, bluish color becomes stronger and the color tone becomes darker and different from silver color. The b* value can be easily measured with a spectrophotometer.

Average Pore Diameter of Pores of Porous Printing Medium

In accordance with some embodiments of the present invention, a porous printing medium is used.

The porous printing medium has no limit so long as the pores can be clogged with silver particles and ink constituents other than colorants, such as water, can be absorbed therein. For example, a printing medium having pores capable of absorbing the vehicle of ink may be used.

The porous printing medium itself may be formed of a porous material. Alternatively, the porous printing medium may have a porous layer (ink absorbing layer) on its printing surface.

Preferably, the average pore diameter of the pores is in the range of from 100 to 400 nm, more preferably from 120 to 300 nm, so that the vehicle of the ink containing silver particles is effectively absorbed and a silver-color printed surface having high image clarity is immediately obtained after printing. When the average pore diameter of the pores is in the range of from 100 to 400 nm, the vehicle can be effectively absorbed and a silver-color printed surface having high image clarity can be obtained.

The pore diameter of the pores can be measured by observing a printing surface or cross-section of the printing medium with a microscope, such as optical microscope, laser microscope, scanning electron microscope (SEM), or transmission electron microscope (TEM).

In the present disclosure, the "average pore diameter" of the pores refers to the average of the pore diameters of the pores. The average pore diameter is calculated without taking into account the pore diameter values which are equal to or less than 100 nm. Specifically, void areas observed in a 10-µm-square area in a SEM image of the printing surface are used to calculate the average pore diameter. As to void areas not being a true circle, the pore diameter is calculated from the average of the longest diameter and the shortest diameter.

Film Thickness of Porous Layer

In a case in which a porous layer (ink absorbing layer) is formed on a printing surface of the printing medium, the film thickness of the porous layer refers to the average thickness thereof. Preferably, the film thickness of the porous layer is in the range of from 1 to 50 µm, and more preferably from 3 to 30 µm. When the ink containing silver particles is printed on the porous layer having a film thickness within the above range, a silver-color printed surface having high image clarity is immediately obtained. When the film thickness of the porous layer is within the range of from 1 to 50 µm, the vehicle can be effectively absorbed therein and a silver-color printed surface having high image clarity can be obtained.

The film thickness of the porous layer can be measured by cutting the printing medium and observing a cross-section of the printing medium with a microscope, such as optical microscope, laser microscope, scanning electron microscope (SEM), or transmission electron microscope (TEM).

Porous Layer Material

The printing medium having a porous layer comprises a porous material. Specific preferred examples of the porous material include, but are not limited to, silica and alumina that have excellent film formation property on resin substrates (e.g., PET (polyethylene terephthalate), vinyl chloride), film uniformity, adhesiveness and safety. Commercially-available printing media already having a porous layer comprising silica and/or alumina are preferably used. Alternatively, non-absorptive or poorly-absorptive recording media may be used on which a porous layer is formed by applying a coating liquid containing alumina and/or silica thereto. The porous layer can be formed from a commercially-available silica or alumina coating material in a sol or gel state, by means of blade coating, gravure coating, bar coating, roll coating, dip coating, curtain coating, slide coating, die coating, and spray coating.

Silica or Alumina Coating Agent

Silica or alumina serving as a coating agent may have a spherical shape. Such spherical particles may be connected into a rosary-like shape or a branched shape (e.g., a chain-like shape, a pearl-necklace-like shape).

The surface of the coating agent may be modified with an ion or compound, such as ammonia, calcium, and alumina.

Specific examples of silica coating agents include, but are not limited to: SNOWTEX® series S, N, UP, ST-XS, ST-O, ST-C, and ST-20 (available from Nissan Chemical Industries, Ltd.); CATALOID series SI-350, SI-30, SN, SA, S-20L, S-20H, S-30L, and S-30H (available from JGC Catalysts and Chemicals Ltd.); and AEROSIL® series 200, 200V, 200CF, and 300 (available from Nippon Aerosil Co., Ltd.). Specific examples of alumina coating agents include, but are not limited to, ALUMINA CLEAR SOL 5S, F1000, F3000, and A2 (available from Kawaken Fine Chemicals Co., Ltd.).

Abrasion Resistance of Ink Containing Silver Particles

If only the ink containing silver particles is directly printed on a substrate, abrasion resistance of the resulting printed matter will be poor because of mere attachment of the silver particles to the substrate. In addition, if the silver particles are silver nano particles, the color tone will become unnatural silver color. If a resin ink containing no colorant is printed first and thereafter the ink containing silver particles is printed thereon, abrasion resistance will be improved to some extent but insufficient. In addition, the color tone will become unnatural silver color. To solve these problems and improve abrasion resistance, a transparent resin layer may be formed on the printed layer.

Resin Layer on Printed Layer

Preferably, the resin in the resin layer is highly transparent as much as possible. Specific preferred examples of such resins include PET (polyethylene terephthalate) and PP (polypropylene). In addition, nylon may also be used as the resin. The printed surface or printed matter as a whole is preferably covered with such a resin by a laminate treatment. Alternatively, an overcoat treatment is also preferred in which a water solution or solvent solution of a transparent resin is applied. The resin layer can be formed by blade coating, gravure coating, bar coating, roll coating, dip coating, curtain coating, slide coating, die coating, and spray coating. The resin layer formed on the printed surface may have a film thickness in the range of from 4 to 350 µm. Preferably, the film thickness is in the range of from 5 to 300 µm, more preferably from 10 to 300 µm, for excellent abrasion resistance, durability, and flaw resistance, and high image clarity and metallic luster of silver.

Commercially-Available Porous Printing Media

Preferably, the porous printing medium has an average pore diameter in the range of from 100 to 400 nm. Specific examples of such porous printing media include, but are not limited to: an inkjet film RM-1GP01 (available from Ricoh Co., Ltd.); NB-WF-3GF100 and NB-RC-3GR120 (available from Mitsubishi Paper Mills Limited); PT-201A420, SD-101A450, GL-101A450, GP-501A450, SP-101A450, PT-101A420, and PR101 (available from Canon Inc.); EJK-QTNA450, EJK-EPNA450, EJK-CPNA450, EJK-RCA450, EJK-CGNA450, EJK-GANA450, EJK-NANA450, and EJK-EGNA450 (available from ELECOM Co., Ltd.); WPA455VA, WPA450RPM, G3A450A, G3A450A, and WPA420HIC (available from FUJIFILM Corporation); KA420SCKR, KA450PSKR, and KA450SLU (available from Seiko Epson Corporation); and BP71GAA4 (available from Brother Industries, Ltd.)

The following description is based on a case in which black, cyan, magenta, and yellow inks are used, where each of the ink is replaceable with the ink containing silver particles.

Recording Device and Recording Method

The ink according to an embodiment of the present invention can be suitably applied to various recording devices employing an inkjet recording method, such as printers, facsimile machines, photocopiers, multifunction peripherals (having the functions of printer, facsimile machine, and photocopier), and three-dimensional objects manufacturing devices.

In the present disclosure, the recording device and the recording method respectively represent a device capable of discharging inks or various treatment liquids to a recording medium and a method for recording an image on the recording medium using the device. The recording medium refers to an article to which the inks or the various treatment liquids can be attached at least temporarily.

The recording device may further optionally include devices relating to feeding, conveying, and ejecting of the recording medium and other devices referred to as a pretreatment device or an aftertreatment device, in addition to the ink discharger.

The recording device may further optionally include a heater for use in the heating process and a drier for use in the drying process. Examples of the heater and the drier include devices for heating and drying the printed surface and the reverse surface of a recording medium. Specific examples of the heater and the drier include, but are not limited to, a fan heater and an infra-red heater. The heating process and the drying process may be performed either before, during, or after printing.

In addition, the recording device and the recording method are not limited to those producing merely meaningful visible images such as texts and figures with the ink. For example, the recording device and the recording method can produce patterns like geometric design and 3D images.

The recording device includes both a serial type device in which the discharge head is caused to move and a line type device in which the discharge head is not moved.

Furthermore, in addition to the desktop type, the recording device includes a device capable of printing images on a large recording medium with AO size and a continuous printer capable of using continuous paper reeled up in a roll form as recording media.

Figure 2:
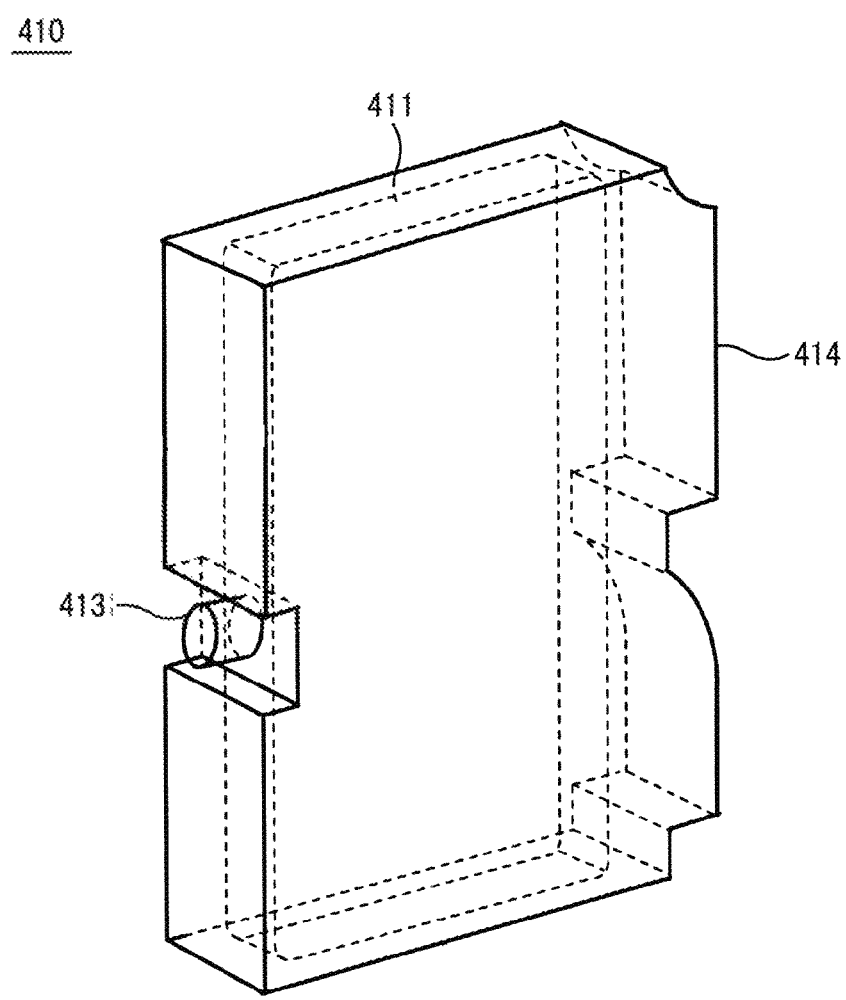
FIG. 2 is a perspective view of a main tank for storing an ink according to an embodiment of the present invention.

As one example of the recording device according to an embodiment of the present invention, an image forming apparatus 400 is described in detail below with reference to FIGS. 1 and 2. FIG. 1 is a perspective view of the image forming apparatus 400. FIG. 2 is a perspective view of a main tank for use in the image forming apparatus 400. The image forming apparatus 400 is a serial type image forming apparatus. A mechanical unit 420 is disposed in a housing 401 of the image forming apparatus 400. Main tanks 410$k$, 410$c$, 410$m$, and 410$y$ for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic. As a result, the main tank 410 is used as an ink cartridge of each color.

A cartridge holder 404 is disposed on the rear side of the opening when a cover 401$c$ is opened. The main tank 410 is detachably attachable to the cartridge holder 404. As a result, each ink discharging outlet 413 of the main tank 410 communicates with a discharge head 434 for each color via a supplying tube 436 for each color so that the ink can be discharged from the discharge head 434 to a recording medium.

The recording device according to an embodiment of the present invention may further optionally include a pretreatment device and/or an aftertreatment device, in addition to the ink discharger.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than inkjet recording method, such as blade coating, roll coating, or spray coating.

In the present disclosure, "image forming", "recording", and "printing" are treated as synonymous terms.

Effects of Embodiments of Invention

1) A printed matter including a porous printing medium and a printed surface containing silver and having an appropriate film thickness, high image clarity, and silver color is provided.

2) A printed matter having a printed surface having high image clarity is provided immediately after a printing process without drying process.

3) A printing device employing inkjet printing method is provided that provides high image clarity.

4) A printed matter and a printing device both using an ink with high safety are provided.

5) A printed matter with a resin coating (laminate) is provided that changes little with time. In particular, time degradation of image clarity, that is generally caused by sulfuration of silver caused by exposure of the printed surface containing silver to the air, is suppressed by the resin coating (laminate).

6) A printed matter with a resin coating (laminate) is provided that has excellent abrasion resistance.

7) A printing device having a resin coating (laminate) function is provided that forms a resin coating immediately after a printing process to provide a printed matter having more excellent time degradation resistance and abrasion resistance.

EXAMPLES

Further understanding can be obtained by reference to certain specific examples which are provided herein for the purpose of illustration only and are not intended to be limiting.

Preparation of Silver Particles

First, 66.8 g of silver nitrate, 7.2 g of a polymeric dispersant having carboxyl group (DISPERBYK 190 available from BYK Japan KK, containing water as the solvent and 40% of non-volatile components and having an acid value of 10 mgKOH/g and an amine value of 0), and 1.8 g of cholic acid (available from Wako Pure Chemical Industries, Ltd.) were poured in 100 g of ion-exchange water and vigorously stirred, thus obtaining a suspension.

Next, 100 g of dimethylaminoethanol (available from Wako Pure Chemical Industries, Ltd.) were gradually added to the suspension while keeping its temperature at 50° C. or less, and thereafter heat-stirred in a water bath at 50° C. for 3 hours.

The resulting reaction liquid was filtered with a glass filter (ADVANTEC GC-90 having a pore size of 0.8 μm), thus obtaining a silver particle dispersion liquid containing 20% by mass of silver.

The silver particle dispersion liquid was subjected to a measurement of a particle diameter of silver particles using a transmission electron microscope (available from JEOL Ltd.). As a result, the number average particle diameter of the primary particles was about 50 nm.

Another silver particle dispersion liquid containing primary particles of silver having a number average particle diameter of 101 nm was obtained by repeating the above-described procedure except for eliminating the cholic acid.

This silver particle dispersion liquid containing primary particles of silver having a number average particle diameter of 101 nm was left to stand at 25° C. for 5 hours, and thereafter the supernatant liquid was collected by decantation. Thus, a silver particle dispersion liquid containing primary particles of silver having a number average particle diameter of 100 nm was obtained.

Other silver particle dispersion liquids each containing primary particles of silver having a number average particle diameter of 60 nm and 80 nm, respectively, were obtained by repeating the above-described procedure except for decreasing the amount of cholic acid by half (i.e., 0.9 g) and changing the stirring time to 3 hours and 15 hours, respectively.

Another silver particle dispersion liquid containing primary particles of silver having a number average particle diameter of 30 nm was obtained by repeating the above-described procedure except for increasing the amount of cholic acid 15 times (i.e., 2.7 g) and changing the stirring time to 6 hours.

This silver particle dispersion liquid containing primary particles of silver having a number average particle diameter of 30 nm was left to stand at 35° C. for 5 hours, and thereafter the supernatant liquid was collected by decantation. Thus, a silver particle dispersion liquid containing primary particles of silver having a number average particle diameter of 15 nm was obtained.

Another silver particle dispersion liquid containing primary particles of silver having a number average particle diameter of 14 nm was obtained by collecting a part of the supernatant liquid which was occupying upper 10% of the total volume.

Each of the above-prepared silver particle dispersion liquids was containing 20% by mass of silver.

Preparation of Ink Containing Silver Particles

The above-prepared silver particle dispersion liquid containing primary particles of silver having a number average particle diameter of about 50 nm, 2,4,7,9-tetramethyldecane-4,7-diol, 1,2-propanediol, 3-ethyl-3-hydroxymethyloxetane, a preservative and fungicide PROXEL LV (available from AVECIA GROUP), and ion-exchange water were mixed and stirred at each ratio described in Table 1, and thereafter filtered with a 0.2-μm polypropylene filter. Thus, inks 1 to 4 were prepared. The composition and silver particle concentration of each ink are described in Table 1.

was observed with a scanning electron microscope to determine the average pore diameter. The results are presented in Table 2.

Preparation of Silica-Based Porous Printing Media M13 and M14

SNOWTEX® UP (colloidal silica available from Nissan Chemical Industries, Ltd.) was mixed with 1% by mass of a surfactant FS34 (available from E. I. du Pont de Nemours and Company) to prepare a mixture liquid. The mixture liquid was formed into a film on OK TOPCOAT paper sheet (available from Oji Paper Co., Ltd.) by wire bar coating, such that the average film thickness of the film after being dried became that described in Table 2 for M13 or M14. The surface of the film was observed with a scanning electron microscope to determine the average pore diameter. The results are presented in Table 2

TABLE 2

| Printing Medium No. | Product Name | Average Pore Diameter of Pores | Film Thickness of Porous Layer |
|---|---|---|---|
| M1 | Gloss Paper for InkJet (KASSAI SHASHIN-SHIAGE Pro WPA460PRO from FUJIFILM Corporation) | 300 nm | 30 μm |
| M2 | Gloss Paper for InkJet (PLUTINUM PHOTOGRAPH PAPER EJK-QTA420 from ELECOM Co., Ltd.) | 200 nm | 15 μm |
| M3 | Gloss Paper for InkJet (PICTORICO PHOTO PAPER PPR200-A4/20 from Pictorico) | 300 nm | 20 um |
| M4 | Gloss Paper for InkJet | 200 nm | 20 um |

TABLE 1

| Ink No. | Silver Particle Concentration in Ink | Silver Particle Dispersion Liquid | 2,4,7,9-Tetramethyl decane-4,7-diol | 1,2-Propanediol | 3-Ethyl-3-hydroxymethyl oxetane | Preservative and Fungicide PROXEL LV | Ion-exchange Water |
|---|---|---|---|---|---|---|---|
| Ink 1 | 12 | 60 | 0.5 | 14 | 8 | 0.1 | 17.4 |
| Ink 2 | 3 | 15 | 0.5 | 28 | 18 | 0.1 | 38.4 |
| Ink 3 | 0.8 | 4 | 0.5 | 35 | 20 | 0.1 | 40.4 |
| Ink 4 | 16 | 80 | 0.5 | 6 | 3 | 0.1 | 10.4 |

(Numerals in Table 1 represent percentage (%) by mass.)

Printing Media

Printing media used in Examples are listed in Table 2 with their product names, average pore diameter of pores, and film thicknesses of porous layers.

Printing media M1 to M10 and M15 are commercialized products. Printing media M11 to M14 are non-commercialized products and the porous layer of each of which was formed in the following manner.

Preparation of Printing Media Having Porous Layer

Preparation of Alumina-Based Porous Printing Media M11 and M12

ALUMINA CLEAR SOL A2 (available from Kawaken Fine Chemicals Co., Ltd.) was mixed with 1% by mass of a surfactant FS34 (available from E. I. du Pont de Nemours and Company) to prepare a mixture liquid. The mixture liquid was formed into a film on a vinyl chloride sheet (AVERY 3000) by wire bar coating, such that the average film thickness of the film after being dried became that described in Table 2 for M11 or M12. The surface of the film TABLE 2-continued

| Printing Medium No. | Product Name | Average Pore Diameter of Pores | Film Thickness of Porous Layer |
|---|---|---|---|
| | (CANON PHOTO PAPER, GLOSSY PROFESSIONAL [PLATINUM GRADE] PT-201 from Canon Inc.) | | |
| M5 | Vinyl Chloride Sheet(Avery3000) | No Pore | — |
| M6 | Plain Paper(Ricoh My paper) | 20 μm | 95 μm |
| M7 | Gloss Paper QP for InkJet QP from Konica Minolta, Inc. | 20 nm | 20 μm |
| M8 | Semigloss Papper MC from Seiko Epson Corporation | 10 nm | 15 μm |
| M9 | Gloss Film from Seiko Epson Corporation | No Pore | — |
| M10 | OHP Film from HP Inc. | 40 nm | 25 μm |
| M11 | Vinil Chloride Sheet having Porous Alumina Layer | 250 nm | 3 μm |

TABLE 2-continued

| Printing Medium No. | Product Name | Average Pore Diameter of Pores | Film Thickness of Porous Layer |
|---|---|---|---|
| M12 | Vinil Chloride Sheet having Porous Alumina Layer | 250 nm | 0.3 μm |
| M13 | OK TOPCOAT Paper having Silica Layer | 120 nm | 5 μm |
| M14 | OK TOPCOAT Paper having Silica Layer | 120 nm | 0.5 μm |
| M15 | InkJet Film RM-1GP01 from Ricoh Co., Ltd. | 230 nm | 15 μm |

Printing Test with Inkjet Printer

An inkjet printer IPSIO SG 3100 (product of Ricoh Co., Ltd.) was filled with each of the above-prepared inks to conduct a printing test. In the printing test, a 100% solid image was printed on a 50-mm-square area on each printing medium.

Printing Test with Bar Coating

Each of the above-prepared ink was formed into a printed layer by bar coating using a wire bar, such that the wet film thickness became 2 μm.

Measurement of Image Clarity

Image clarity (2 mm) was measured according to JIS H8686-2 using an image clarity meter ICM-1 (available from Suga Test Instruments Co., Ltd.).

Measurement of b* Value b* value was measured with a handy spectrophotometer (available from X-Rite Inc.).

Measurement of Film Thickness of Printed Layer

The film thickness of each printed layer was measured by cutting each printing medium and observing the cross section with a scanning electron microscope.

Examples 1-12 and Comparative Examples 1-12

Print samples were prepared according to each combination of ink and print medium described in Table 3. Image clarity and b* value thereof were measured and listed in Table 3.

TABLE 3

| | Ink No. | Printing Medium | Printing Method | Film Thickness of Printed Layer | Image Clarity | b* Value |
|---|---|---|---|---|---|---|
| Example 1 | Ink 1 | M1 | Inkjet | 160 nm | 60 | +1.1 |
| Example 2 | Ink 1 | M2 | Inkjet | 160 nm | 55 | +1.2 |
| Example 3 | Ink 1 | M3 | Inkjet | 160 nm | 48 | +0.6 |
| Example 4 | Ink 1 | M4 | Inkjet | 160 nm | 53 | +1.0 |
| Example 5 | Ink 2 | M1 | Inkjet | 150 nm | 65 | +0.8 |
| Example 6 | Ink 2 | M2 | Inkjet | 60 nm | 7 | +1.1 |
| Example 7 | Ink 2 | M3 | Inkjet | 55 nm | 6 | +1.0 |
| Example 8 | Ink 2 | M4 | Inkjet | 150 nm | 60 | +1.1 |
| Example 9 | Ink 1 | M11 | Inkjet | 100 nm | 48 | −1.8 |
| Example 10 | Ink 1 | M13 | Inkjet | 100 nm | 55 | −1.5 |
| Example 11 | Ink 1 | M1 | Wire Bar | 51 nm | 22 | +1.0 |
| Example 12 | Ink 2 | M2 | Wire Bar | 295 nm | 46 | +1.4 |
| Comparative Example 1 | Ink 1 | M3 | Wire Bar | 305 nm | 3 | +4.9 |
| Comparative Example 2 | Ink 2 | M4 | Wire Bar | 380 nm | 2 | +5.2 |
| Comparative Example 3 | Ink 1 | M5 | Inkjet | 200 nm | 3 | +5.0 |
| Comparative Example 4 | Ink 2 | M6 | Inkjet | 8 nm | 1 | +14.5 |
| Compamtive Example 5 | Ink 1 | M7 | Inkjet | 180 nm | 4 | +4.8 |
| Comparative Example 6 | Ink 2 | M8 | Inkjet | 190 nm | 4 | +4.9 |
| Comparative Example 7 | Ink 1 | M9 | Inkjet | 210 nm | 3 | +5.1 |
| Comparative Example 8 | Ink 2 | M10 | Inkjet | 170 nm | 4 | +4.7 |
| Comparative Example 9 | Ink 1 | M12 | Inkjet | 220 nm | 3 | +4.8 |
| Comparative Example 10 | Ink 1 | M14 | Inkjet | 210 nm | 3 | +5.3 |
| Comparative Example 11 | Ink 3 | M1 | Inkjet | 10 nm | Unmeasurable | +4.5 |
| Comparative Example 12 | Ink 4 | M1 | Inkjet | Ink Undischargeable | — | — |

An effect of the porous printing media having an average pore diameter of from 100 to 400 nm is confirmed by comparison between Examples 1-12 and Comparative Examples 3-8.

An effect of the porous layers having a thickness of from 1 to 50 μm is confirmed by comparison between Examples 1-12 and Comparative Examples 9-10.

An effect of the content rate of silver particles in the range of from 1.0% to 15.0% by mass is confirmed by comparison between Examples 1-12 and Comparative Examples 11-12.

An effect of the porous layer containing silica and/or alumina is confirmed by Examples 1-12.

An effect of inkjet printing methods is confirmed by Examples 1-10.

Example 13

The inkjet printer was filled with the ink 1 and printed a 100% solid image on a 50-mm-square area in the printing medium M15 (RM-1GP01 product of Ricoh Co., Ltd.). The printed matter was laminate-coated with a PET sheet having a thickness of 50 μm.

Examples 14-16

The inkjet printer was filled with the ink 1 and printed a 100% solid image on a 50-mm-square area in the printing medium M15 (RM-1GP01 product of Ricoh Co., Ltd.). The printed matter was laminate-coated with a PP sheet having a thickness of 10 μm, 100 μm, or 300 μm.

Examples 17-18

The inkjet printer was filled with the ink 1 and printed a 100% solid image on a 50-mm-square area in the printing medium M15 (RM-1GP01 product of Ricoh Co., Ltd.). The printed matter was laminate-coated with a PP sheet having a thickness of 4 μm or 350 μm.

The image clarity and b* values for the coated samples of Examples 1, 2, and 13-18, measured at an initial stage and after each sample had been exposed to an environment having a temperature of 25° C. and a humidity of 50% for 30 days, are presented in Table 4. In Table 4 showing the exposure test results, Examples 1 and 2 are presented as Examples 1' and 2', respectively, to avoid confusion with the results thereof presented in Table 3.

In addition, the following abrasion test was performed before the exposure test.

Abrasion Resistance Test

Each printed matter after being dried was set in a Color Fastness Rubbing Tester AB-301 (available from TESTER SANGYO CO., LTD.) and rubbed 50 times with a friction element (with a load of 300 g), to the contact part of which a white cotton cloth (according to JIS L 0803) was attached. The degree of deterioration was visually observed to evaluate abrasion resistance based on the following criteria.

S: The number of flaws was 5 or less and the background was invisible.

A: The number of flaws was more than 5 but the background was invisible.

B: The number of flaws was more than 5 and most part of the background (printing medium) was exposed.

The abrasion resistance test results are presented in Table 4.

TABLE 4

|  | Initial Image Clarity | Initial b* Value | Abrasion Resistance Rank | Image Clarity after Exposure | b* Value after Exposure |
| --- | --- | --- | --- | --- | --- |
| Example 1' | 60 | +1.1 | B | 40 | +1.2 |
| Example 2' | 55 | +1.2 | B | 37 | +1.5 |
| Example 13 | 56 | +2.4 | S | 56 | +2.5 |
| Example 14 | 58 | +1.8 | S | 58 | +1.9 |
| Example 15 | 55 | +3.2 | S | 55 | +3.3 |
| Example 16 | 52 | +3.8 | S | 52 | +3.8 |
| Example 17 | 59 | +1.3 | A | 59 | +1.5 |
| Example 18 | 47 | +3.8 | S | 47 | +3.9 |

An effect of the resin layer formed on the printed surface is confirmed by comparison between Examples 1'-2' and Examples 13-18.

An effect of the film thickness of the resin layer in the range of from 5 to 300 μm for abrasion resistance is confirmed by comparison between Examples 13-16 and Examples 17-18.

Examples 19-24 and Comparative Examples 19-20

Print samples were prepared in the same manner as in Example 1 except for changing the ink 1 to each of the silver particle dispersion liquid listed in Table 5 varied in number average particle diameter of primary particles of silver. Image clarity and b* values thereof were measured and the results are presented in Table 5.

It is to be noted that Example 19 is equivalent to Example 1.

TABLE 5

|  | Ink Formula | Printing Medium | Printing Method | Number Average Particle Diameter of Silver Particles (nm) | Image Clarity | b* Value |
| --- | --- | --- | --- | --- | --- | --- |
| Example 19 (Same as Example 1) | Same as Ink 1 | M1 | Inkjet | 50 | 60 | +1.1 |
| Example 20 | Same as Ink 1 | M1 | Inkjet | 60 | 52 | +0.8 |
| Example 21 | Same as Ink 1 | M1 | Inkjet | 80 | 36 | −0.8 |
| Example 22 | Same as Ink 1 | M1 | Inkjet | 30 | 64 | +1.3 |
| Example 23 | Same as Ink 1 | M1 | Inkjet | 15 | 68 | +3.8 |
| Example 24 | Same as Ink 1 | M1 | Inkjet | 100 | 5.0 | +0.2 |
| Comparative Example 19 | Same as Ink 1 | M1 | Inkjet | 14 | 68 | +4.1 |
| Comparative Example 20 | Same as Ink 1 | M1 | Inkjet | 101 | 4.9 | +0.7 |

It is confirmed from the results of Examples 19-23 that both image clarity and b* values are good when the particle diameter of the silver is in the range of from 15 to 100 nm.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A printed matter comprising:
    a porous printing medium; and
    a printed layer containing silver, the printed layer having
        a printed surface having an image clarity (2 mm), defined in Japanese Industrial Standards H8686-2, of 5.0 or more and a b* value in the range of from −7.0 to +4.0.

2. The printed matter of claim 1, wherein the printed layer has an average film thickness in the range of from 50 to 300 nm.

3. The printed matter of claim 1, wherein the porous printing medium has pores having an average pore diameter in the range of from 100 to 400 nm.

4. The printed matter of claim 1, wherein the porous printing medium has a porous layer having a thickness in the range of from 1 to 50 μm.

5. The printed matter of claim 4, wherein the porous layer contains at least one of silica and alumina.

6. The printed matter of claim 1, further comprising a resin layer on the printed layer.

7. The printed matter of claim 6, wherein the resin layer has a film thickness in the range of from 5 to 300 μm.

8. A printing method comprising:
    applying thermal or mechanical energy to an ink containing silver particles; and
    jetting the ink onto a porous printing medium to obtain a printed matter, wherein the porous printing medium has pores having an average pore diameter in the range of from 100 to 400 nm, and the silver particles in the ink have an average particle diameter in the range of from 15 to 100 nm.

9. The printing method of claim 8, wherein the silver particles account for 1.0% to 15.0% by mass of the ink.

10. A printing device comprising:
    an ink containing 1.0% to 15.0% by mass of silver particles having an average particle diameter in the range of from 15 to 100 nm;

a porous printing medium having pores having an average pore diameter in the range of from 100 to 400 nm; and a discharger to discharge the ink onto the porous printing medium.

11. An inkjet printing device comprising:

an ink container containing an ink containing 1.0% to 15.0% by mass of silver particles having an average particle diameter in the range of from 15 to 100 nm;

a porous printing medium having pores having an average pore diameter in the range of from 100 to 400 nm; and a recording unit to discharge liquid droplets of the ink by an action of energy.

12. The inkjet printing device of claim 11, wherein the ink container is an ink cartridge.

13. The inkjet printing device of claim 11, wherein the recording unit includes an inkjet recording head.

14. The printing device of claim 10, further comprising a laminate coating mechanism to form a resin layer.

* * * * *